United States Patent
Sun et al.

(10) Patent No.: US 7,230,827 B2
(45) Date of Patent: Jun. 12, 2007

(54) METHOD AND APPARATUS FOR VENTING A CHASSIS

(75) Inventors: Cecilia H. Sun, Austin, TX (US); James D. Curlee, Round Rock, TX (US); Kenneth Musgrave, Austin, TX (US); Huy Nguyen, Round Rock, TX (US); Lisa Sura, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 54 days.

(21) Appl. No.: 11/110,377

(22) Filed: Apr. 20, 2005

(65) Prior Publication Data

US 2006/0238973 A1    Oct. 26, 2006

(51) Int. Cl.
*H05K 7/20* (2006.01)

(52) U.S. Cl. ............... 361/695; 361/690; 361/692; 454/184; 312/223.1; 312/223.2; 312/223.3

(58) Field of Classification Search ........ 361/684–697, 361/726, 732, 784, 790, 801, 802, 816, 818; 312/223.2, 107, 111, 257.1, 236; 165/80.2, 165/80.3, 104.32, 104.33, 165, 185, 47; 454/184; 174/35 R, 35 MS, 35 GC, 16.1
See application file for complete search history.

(56) References Cited

U.S. PATENT DOCUMENTS

| 5,440,450 | A | | 8/1995 | Lau et al. |
| 6,034,870 | A | * | 3/2000 | Osborn et al. ............... 361/690 |
| 6,086,476 | A | * | 7/2000 | Paquin et al. ............... 454/184 |
| 6,362,417 | B2 | * | 3/2002 | Mitchell et al. ............ 174/384 |
| 6,680,847 | B2 | * | 1/2004 | Heard ......................... 361/692 |
| 2004/0134253 | A1 | * | 7/2004 | Kim .......................... 72/379.2 |
| 2006/0039107 | A1 | * | 2/2006 | Kumano et al. ............ 361/690 |

* cited by examiner

*Primary Examiner*—Michael Datskovskiy
(74) *Attorney, Agent, or Firm*—Haynes and Boone, LLP

(57) ABSTRACT

A chassis venting apparatus includes a chassis defining a chassis enclosure, the chassis enclosure including a first wall, and a chassis vent structure extending from the first wall and into the chassis enclosure, the chassis vent structure defining a chassis venting passageway in the chassis enclosure. Heated air from heat producing components may be vented from the chassis enclosure through the chassis vent structure and the chassis venting passageway, and the first wall and chassis venting passageway may also be used as a handle to lift the chassis.

19 Claims, 6 Drawing Sheets

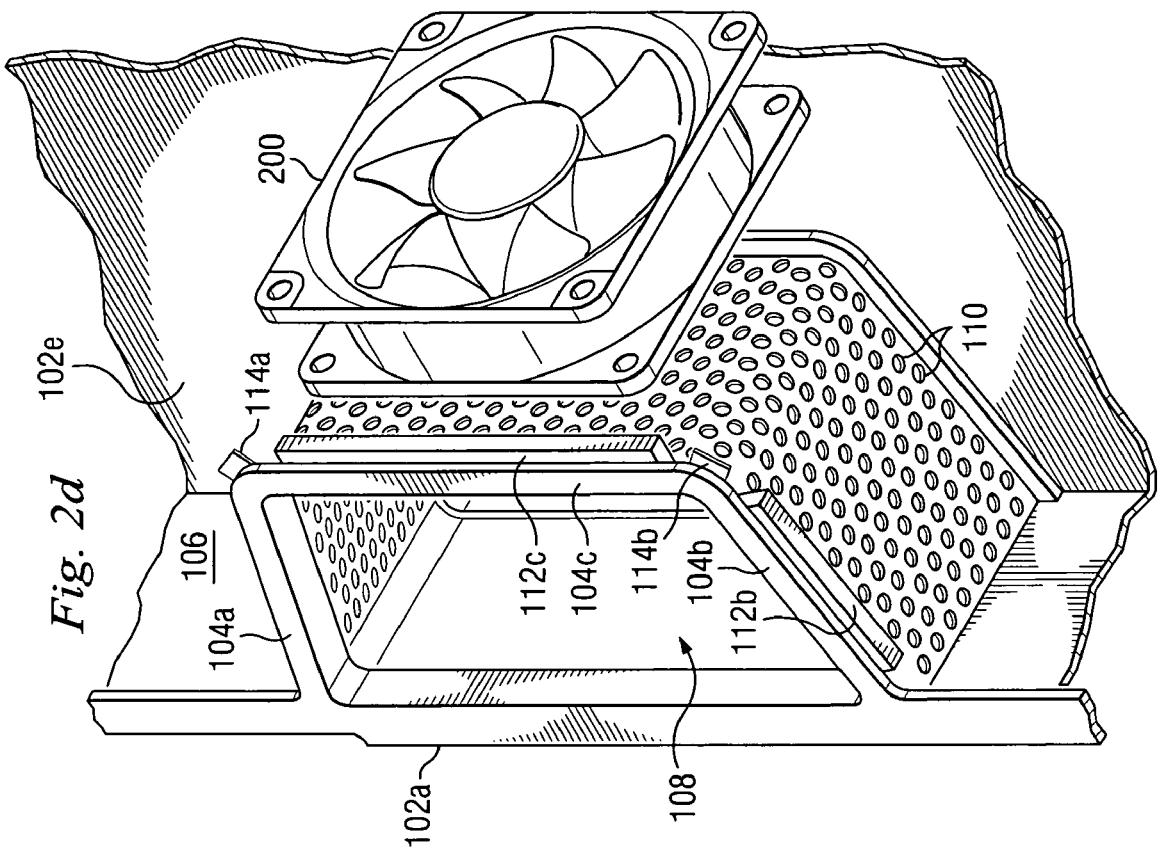
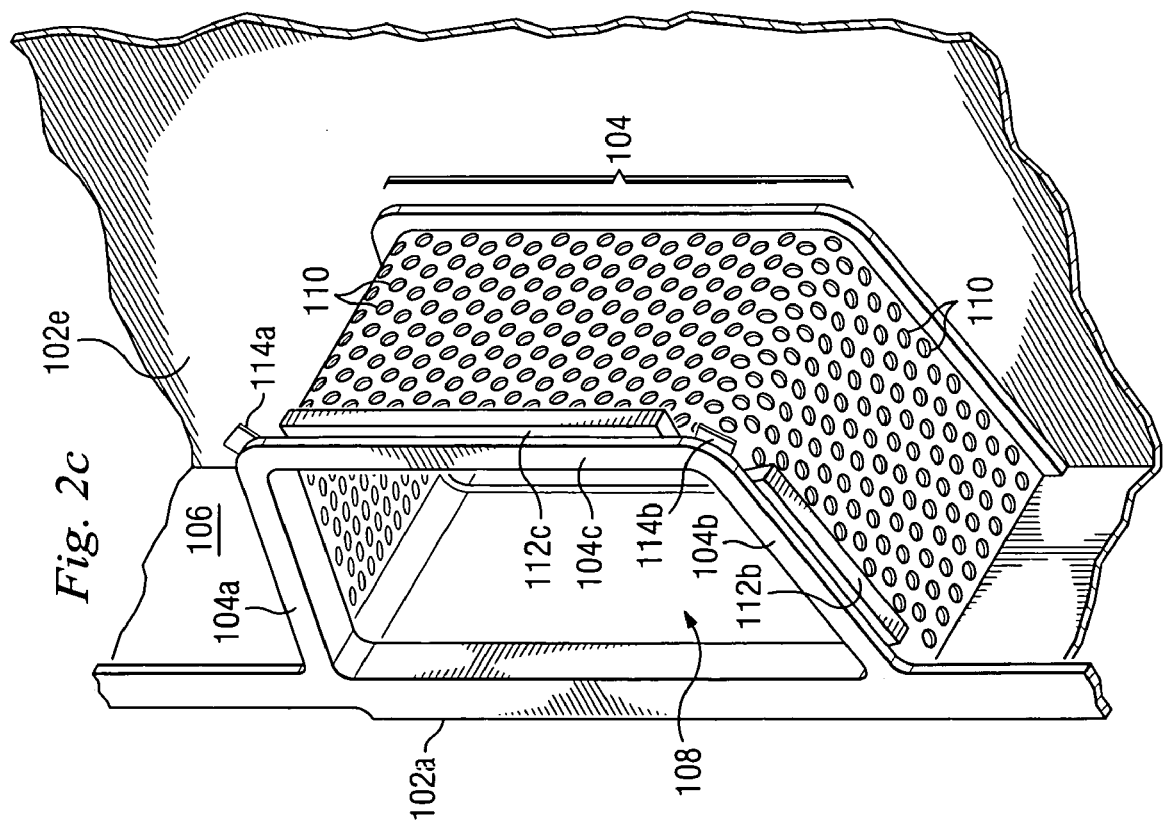

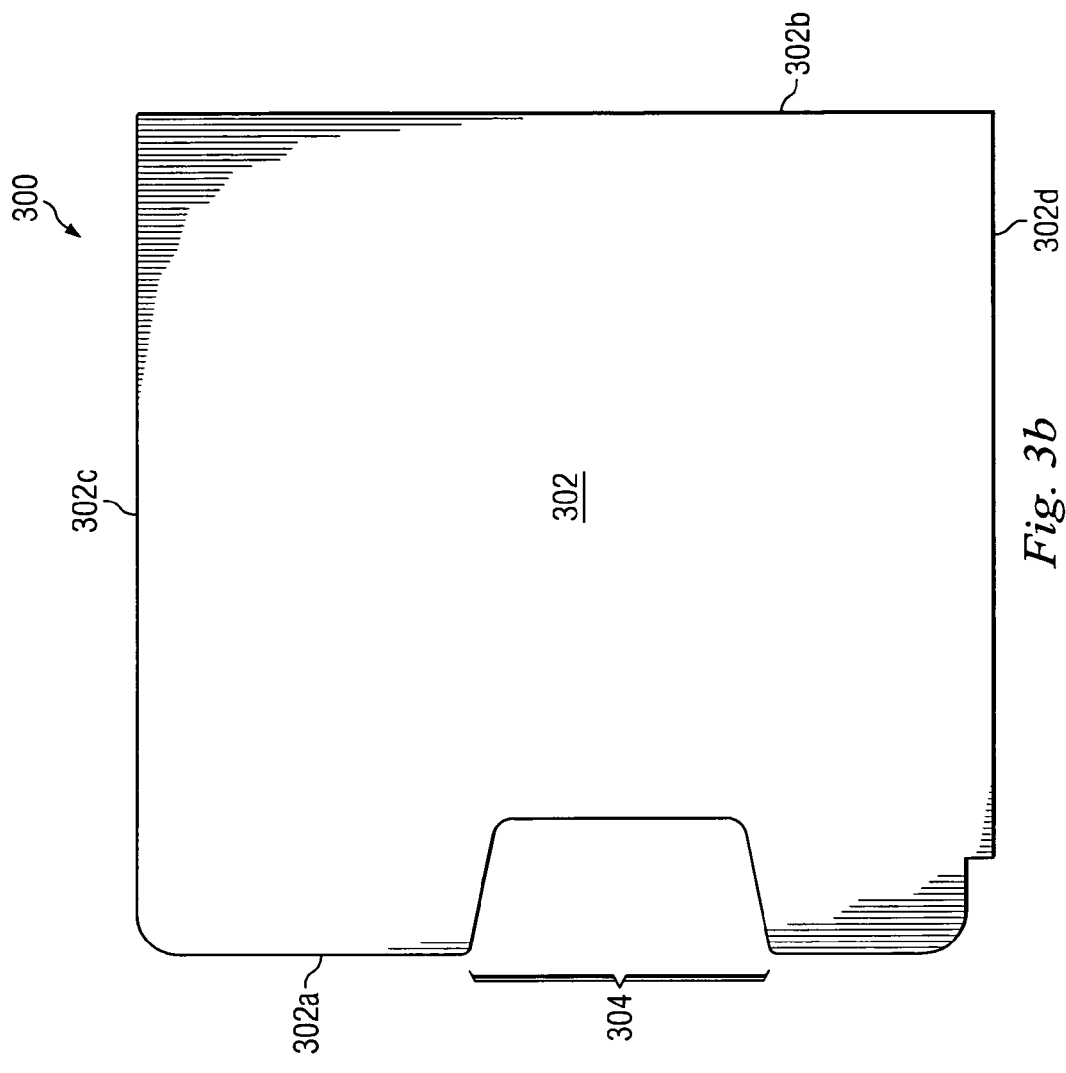
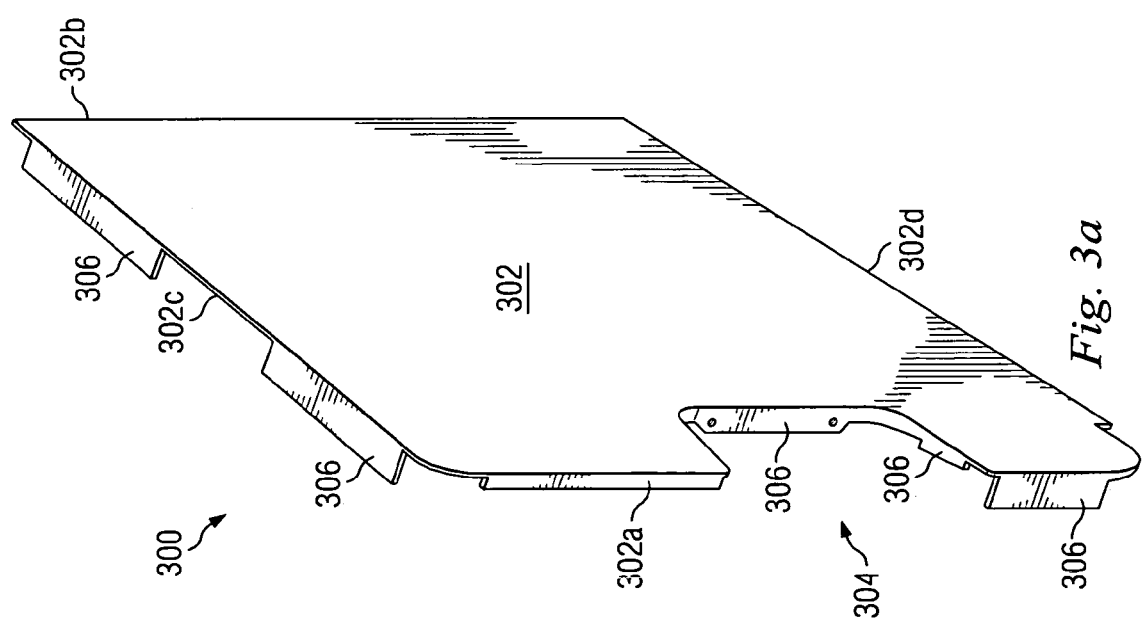

METHOD AND APPARATUS FOR VENTING A CHASSIS

BACKGROUND

The present disclosure relates generally to information handling systems, and more particularly to a method and apparatus for venting an information handling system chassis.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasing power requirements for information handling systems continues to drive the need for greater venting area in the information handling system chassis in order to satisfy thermal dissipation needs. Challenges exist in balancing the need for thermal dissipation with the concerns arising with respect to aesthetic appeal, structural integrity, and electromagnetic interference. For example, some industry standards, such as the Intel BTX standard, utilize venting on the front of the information handling system chassis. Incorporating the necessary venting on the front of the information handling system chassis degrades the structural integrity of the chassis, can acoustically impact the chassis negatively, and provides undesirable, direct visual access to the internal components of the information handling system. In addition, such added venting must be accomplished without adding size to the system, in order to minimize the cost of shipping the system.

Accordingly, it would be desirable to provide a method and apparatus for venting a chassis absent the disadvantages found in the prior methods discussed above.

SUMMARY

According to one embodiment, a chassis venting apparatus is provided that includes a chassis defining a chassis enclosure, the chassis enclosure including a first wall, and a chassis vent structure extending from the first wall and into the chassis enclosure, the chassis vent structure defining a chassis venting passageway in the chassis enclosure.

A principal advantage of this embodiment is that a chassis venting solution is provided that allows chassis venting while concealing the chassis vent structure from sight in order to provide a clean chassis front design. In addition, the chassis venting solution may be used as a handle to lift the chassis.

BRIEF DESCRIPTION OF THE DRAWINGS

FIG. 2b is a side view illustrating an embodiment of the chassis of FIG. 2a.

FIG. 2c is a perspective view illustrating an embodiment of a chassis vent structure on the chassis of FIG. 2a.

FIG. 2d is a perspective view illustrating an embodiment of a fan mounted in the chassis of FIG. 2a and adjacent the chassis vent structure of FIG. 2c.

FIG. 3a is a perspective view illustrating an embodiment of a chassis cover used with the chassis of FIG. 2a.

FIG. 3b is a side view illustrating an embodiment of the chassis cover of FIG. 3a.

FIG. 4a is a perspective view illustrating an embodiment of the chassis cover of FIG. 3a being coupled to the chassis of FIG. 2a.

FIG. 4b is a perspective view illustrating an embodiment of the chassis cover of FIG. 3a coupled to the chassis of FIG. 2a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
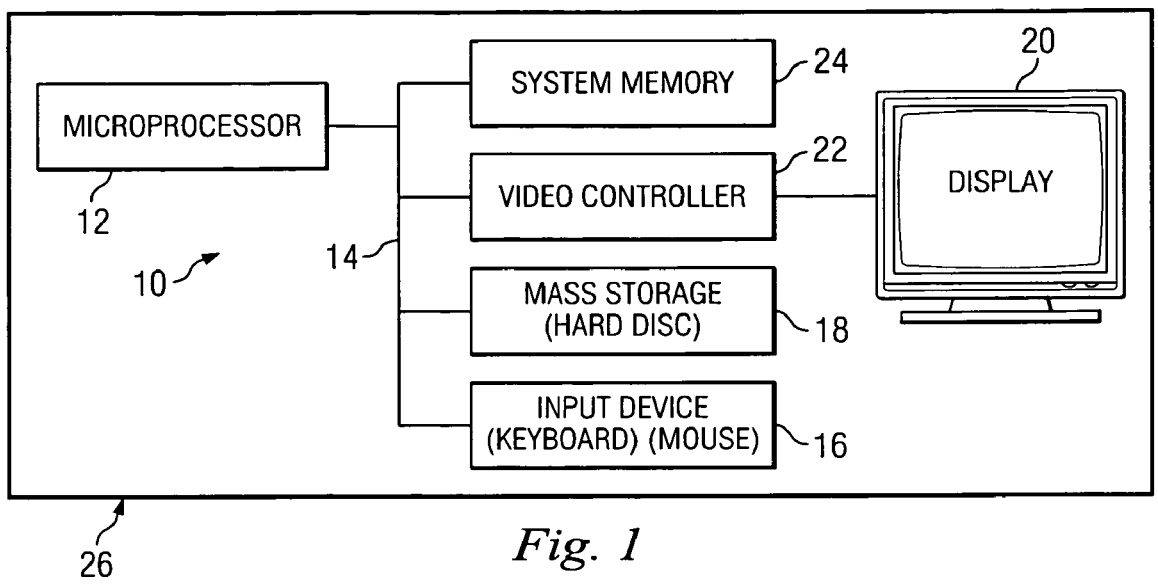
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. In an embodiment, a chassis 26 may house some or all of the components of information handling system 10. It should be understood that other busses and intermediate circuits can be deployed between the components described above and microprocessor 12 to facilitate interconnection between the components and the microprocessor.

Figure 2B:
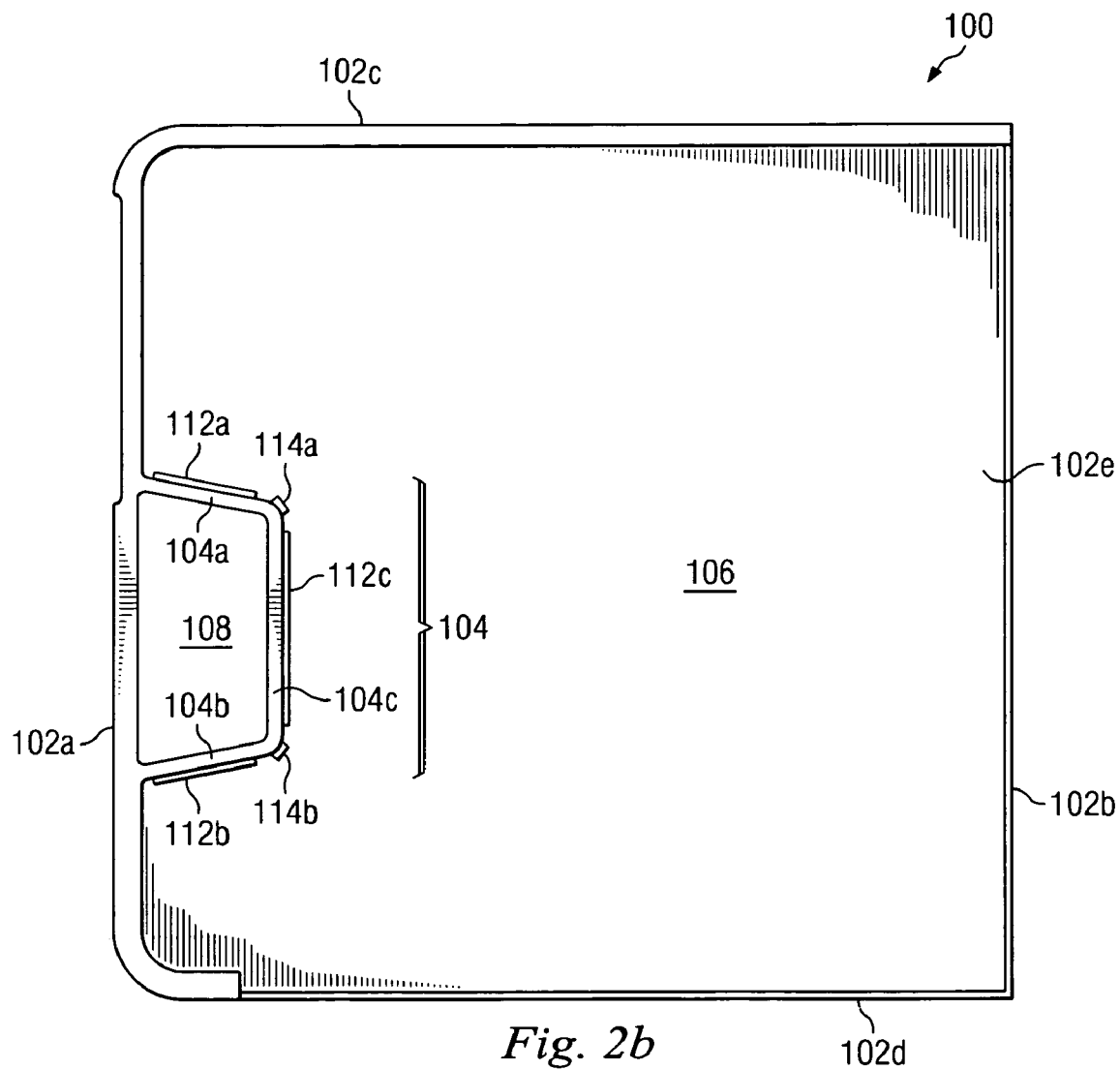
Figure 2A:
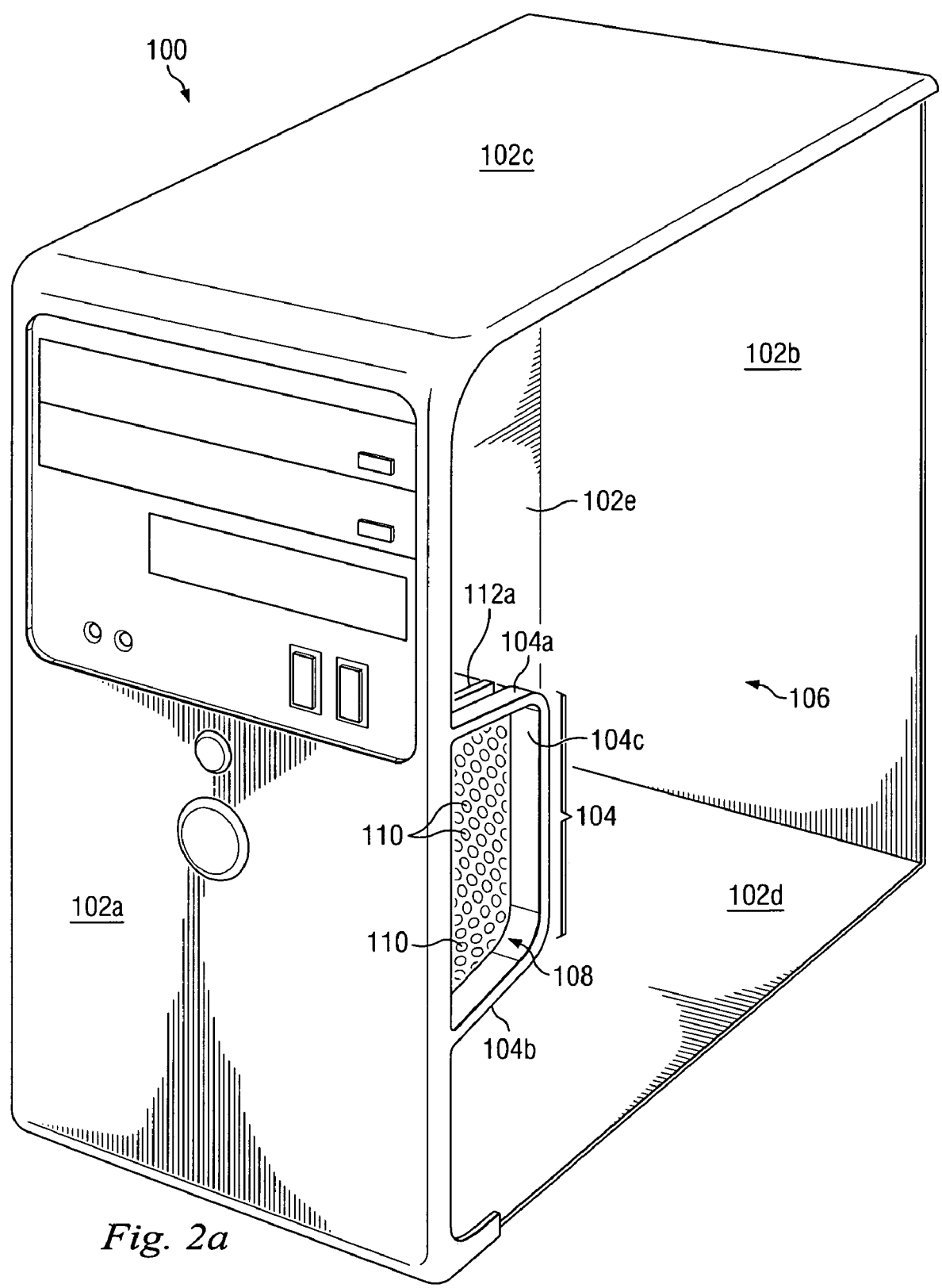
FIG. 2a is a perspective view illustrating an embodiment of a chassis.

Referring now to FIGS. 2a, 2b, and 2c, a chassis 100 which may be, for example, the chassis 26 illustrated in FIG. 1, is illustrated. The chassis 100 includes a front first wall 102a, a rear second wall 102b positioned parallel to and spaced apart from the front first wall 102a, a top third wall 102c extending between the front first wall 102a and the rear second wall 102b, and a bottom fourth wall 102d positioned parallel to and spaced apart fro the top third wall 102c and extending between the front first wall 102a and the rear second wall 102b. A fifth side wall 102e extends between the front first wall 102a, the rear second wall 102b, the top third wall 102c, and the bottom fourth wall 102d. A chassis vent structure 104 extends from the front first wall 102a from a plurality of vent structure walls 104a and 104b which are coupled together and spaced apart by a vent structure wall 104c. The front first wall 102a, the back second wall 102b, the top third wall 102c, and the bottom fourth wall 102d define a chassis enclosure 106 positioned between them. The front first wall 102a and the vent structure walls 104a, 104b, and 104c of the chassis vent structure 104 define a chassis venting passageway 108 positioned between them and extending into the chassis enclosure 106 and through the chassis 100. The vent structure walls 104a, 104b, and 104c of the chassis vent structure 104 also define a plurality of apertures 110 extending through the vent structure walls 104a; 104b and 104c. from the chassis enclosure 106 to the chassis venting passageway 108. A plurality of electromagnetic interference gaskets 112a, 112b, and 112c are coupled to vent structure walls 104a, 104b, and 104c, respectively, and positioned along an edge of each of the vent structure walls 104a, 104b, and 104c, respectively. A plurality of cover coupling tabs 114a and 114b extend from the chassis vent structure 104 along its edge. In an embodiment, the front first wall 102a includes a solid wall portion that obscures the chassis vent structure 104 from sight when the chassis 100 is viewed from directly in front of the front first wall 102a, as illustrated. In an embodiment, the chassis vent structure 104 may extend only partially into the chassis 100 rather than through the chassis 100.

Referring now to FIGS. 2c and 2d, in an embodiment, a fan 200 may be coupled to the fifth side wall 102e and positioned in the chassis enclosure 106 of chassis 100 and adjacent the vent structure wall 104c of chassis vent structure 104. In an embodiment, the fan 200 may be a conventional fan known in the art.

Referring now to FIGS. 3a and 3b, a chassis cover 300 is illustrated. Chassis cover 300 includes a base section 302 having a front first side 302a, a rear second side 302b located opposite the front first side 302a, a top third side 302c, and a bottom fourth side 302d located opposite the top third side 302c. A passageway channel 304 is defined by the base section 302 and located on the front first side 302a. A plurality of chassis coupling tabs 306 are located around the edge of the base section 302 and extend from the front first side 302a, the rear second side 302b, the top third side 302c, the bottom fourth side 302d, and passageway channel 304.

Figure 4A:
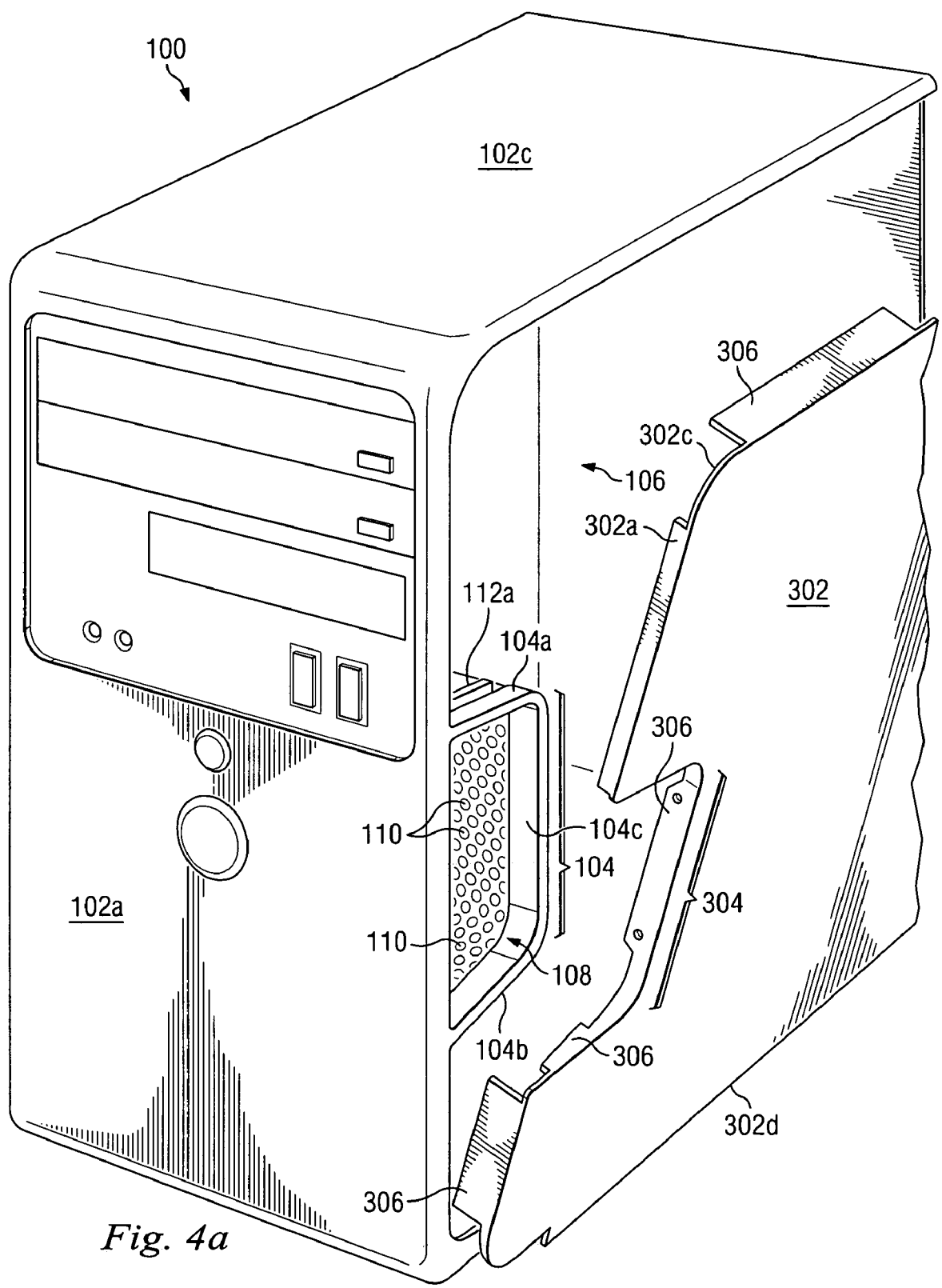
Figure 4B:
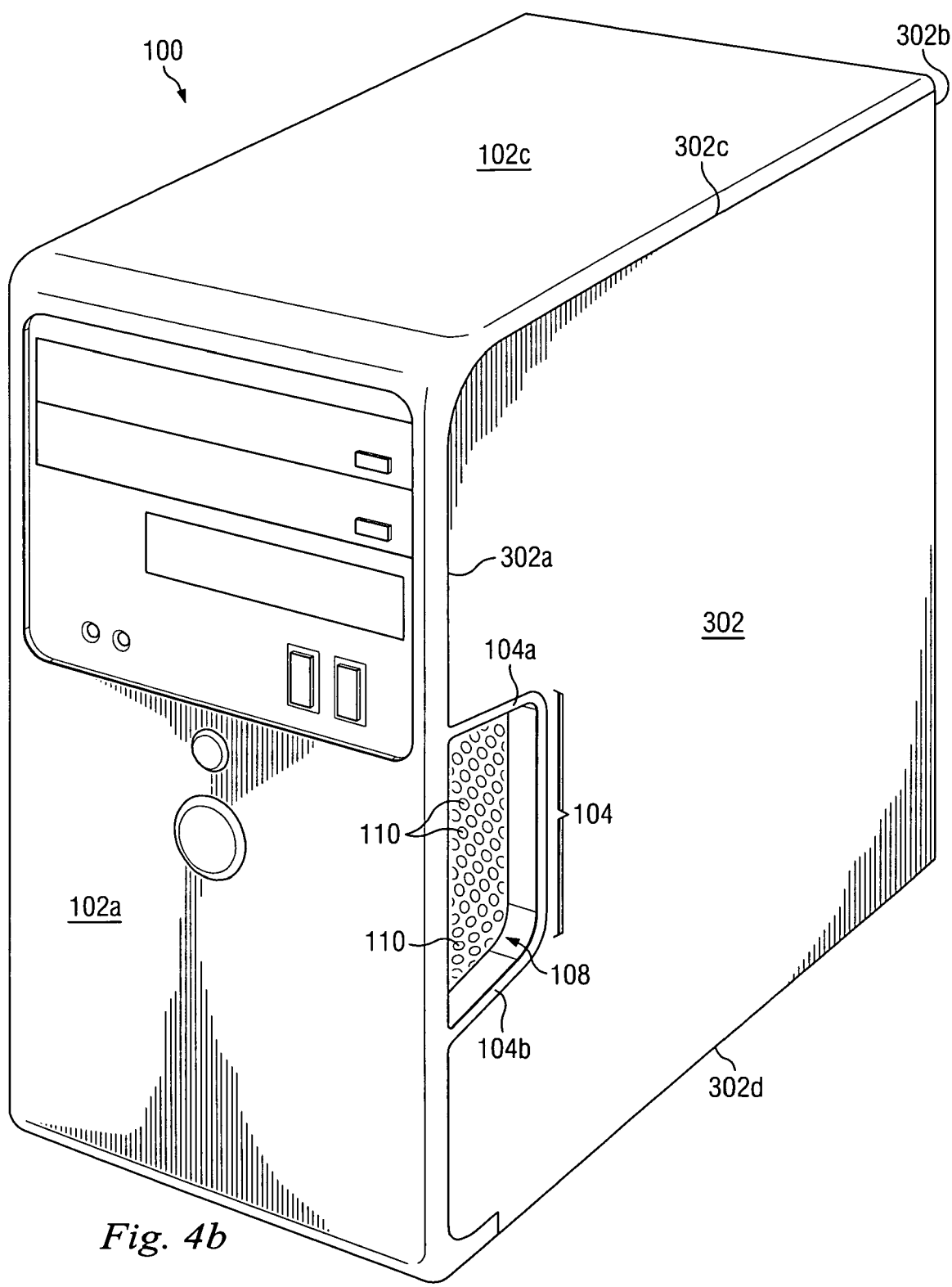

Referring now to FIGS. 2b, 4a, and 4b, in operation, an information handling system such as, for example, the information handling system 10 illustrated in FIG. 1, which may include heat producing components Such as, for example, the microprocessor 12 illustrated in FIG. 1, may be mounted in the chassis enclosure 106 of chassis 100. A fan such as, for example, the fan 200 illustrated in FIG. 2d may be mounted between the heat producing component and the chassis vent structure 104. The chassis cover 300 may then be coupled to the chassis 100 by coupling the front first side 302a on chassis cover 300 to the front first side 102a on chassis 100, the rear second side 302b on chassis cover 300 to the rear second side 102b on chassis 100, the top third side 302c on chassis cover 300 to the top third side 102c on chassis 100, and the bottom fourth side 302d on chassis cover 300 to the bottom fourth side 102d on chassis 100 using the chassis coupling tabs 306 on chassis cover 300, the cover coupling tabs 114a and 114b on chassis 100, and conventional methods known in the art. With the chassis cover 300 coupled to the chassis 100, the electromagnetic interference gaskets 112a, 112b, and 112c help to prevent electromagnetic interference from escaping from the chassis enclosure 106. During operation of the heat producing components mounted within the chassis enclosure 106, the fan may be operated in order to vent hot air from the chassis enclosure 106, through the chassis vent structure 104 by way of the plurality of apertures 110 in the vent structure walls 104a, 104b, and 104c in the chassis vent structure 104, and out of the chassis 100 through the chassis venting passageway 108. Furthermore, the chassis 100 may be lifted and transported by using the chassis venting passageway 108 and the front first wall 102a as a handle by grasping the portion of the front first side 102a of the chassis 100 which is adjacent the chassis vent structure 104. Thus, a means is provided for venting the chassis 100 through the front of the system while obscuring the venting means from sight, while providing a handle for lifting and transporting the chassis 100.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A chassis venting apparatus comprising:
   a chassis defining a chassis enclosure, the chassis enclosure including a first exterior wall and a pair of opposed exterior walls transverse to the first exterior wall; and
   a chassis vent structure extending from the first wall and into the chassis enclosure, the chassis vent structure defining an elongated chassis venting passageway in the chassis enclosure, the passageway having its entire length extending along the first exterior wall and through the opposed exterior walls.

2. The apparatus of claim 1 wherein the first wall includes a solid wall portion positioned adjacent the chassis vent structure.

3. The apparatus of claim 1 further comprising:
   a chassis cover including a channel matingly engaged with the chassis vent structure.

4. The apparatus of claim 1 wherein the chassis vent structure defines a plurality of apertures.

5. The apparatus of claim 1 further comprising:
   a plurality of electromagnetic interference gaskets coupled to the chassis vent structure.

6. The apparatus of claim 1 wherein the chassis venting passageway extends through the chassis.

7. The apparatus of claim 1 wherein the first wall and the chassis venting passageway form a chassis handle.

8. The apparatus of claim 1 further comprising:
a fan coupled to the chassis and positioned in the chassis enclosure adjacent the chassis vent structure.

9. An information handling system comprising:
a chassis defining a chassis enclosure, the chassis enclosure including a first exterior wall and a pair of opposed exterior walls transverse to the first exterior wall;
a microprocessor coupled to the chassis and positioned in the chassis enclosure;
a storage coupled to the microprocessor; and
a chassis vent structure extending from the first wall and into the chassis enclosure, the chassis vent structure defining an elongated chassis venting passageway in the chassis enclosure, the passageway having its entire length extending along the first exterior wall and through the or, posed exterior walls.

10. The system of claim 9 wherein the first wall includes a solid wall portion positioned adjacent the chassis vent structure.

11. The system of claim 9 further comprising:
a chassis cover including a channel matingly engaged with the chassis vent structure.

12. The system of claim 9 wherein the chassis vent structure defines a plurality of apertures.

13. The system of claim 9 further comprising:
a plurality of electromagnetic interference gaskets coupled to the chassis vent structure.

14. The system of claim 9 wherein the chassis venting passageway extends through the chassis.

15. The system of claim 9 wherein the first wall and the chassis venting passageway form a chassis handle.

16. The system of claim 9 wherein the chassis vent structure and the chassis venting passageway are operable to vent heated air out of the chassis enclosure.

17. The system of claim 9 further comprising:
a fan coupled to the chassis and positioned in the chassis enclosure adjacent the chassis vent structure.

18. A method for venting a chassis comprising:
providing a chassis defining a chassis enclosure, the chassis enclosure including a first exterior wall and a pair of opposed exterior walls transverse to the first exterior wall;
extending a chassis vent structure from the first wall to define an elongated chassis venting passageway in the chassis enclosure, the passageway having its entire length extending along the first exterior wall and through the opposed exterior walls;
coupling a heat producing component to the chassis and in the chassis enclosure; and
venting heated air from the chassis enclosure through the chassis vent structure and the chassis venting passageway.

19. The method of claim 18 further comprising: lifting the chassis using a handle formed by the first wall and the chassis venting passageway.

* * * * *

UNITED STATES PATENT AND TRADEMARK OFFICE
CERTIFICATE OF CORRECTION

PATENT NO. : 7,230,827 B2 Page 1 of 1
APPLICATION NO. : 11/110377
DATED : June 12, 2007
INVENTOR(S) : Cecilia H. Sun et al.

It is certified that error appears in the above-identified patent and that said Letters Patent is hereby corrected as shown below:

Column 1, Line 16, delete "or, posed" and insert -- opposed --.

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,230,827 B2 Page 1 of 1
APPLICATION NO. : 11/110377
DATED : June 12, 2007
INVENTOR(S) : Cecilia H. Sun et al.

It is certified that error appears in the above-identified patent and that said Letters Patent is hereby corrected as shown below:

Column 5, Claim 9, Line 16, delete "or, posed" and insert -- opposed --.

This certificate supersedes the Certificate of Correction issued April 29, 2008.

Signed and Sealed this

Sixteenth Day of September, 2008

JON W. DUDAS
*Director of the United States Patent and Trademark Office*